United States Patent Office 2,910,778
Patented Nov. 3, 1959

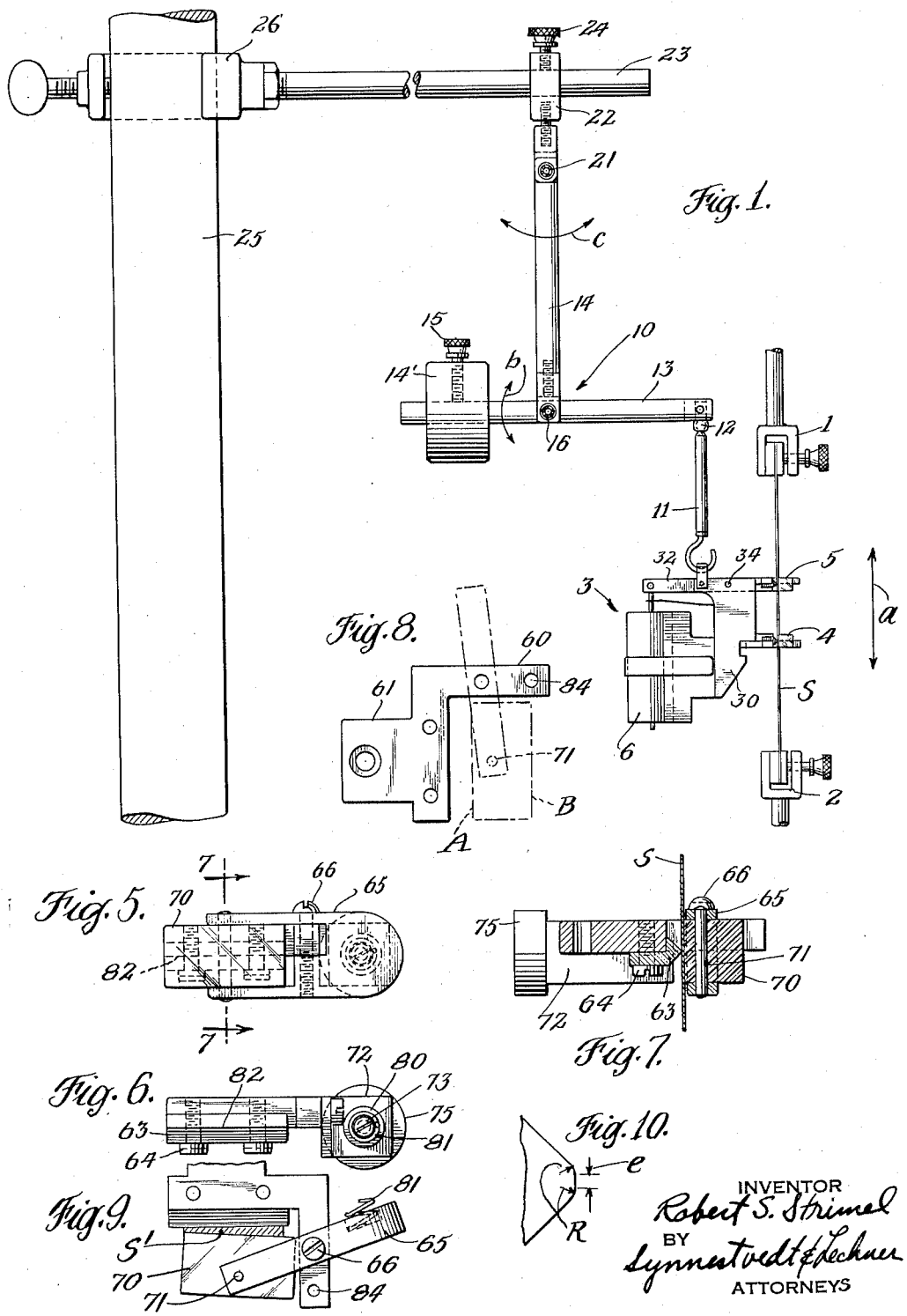

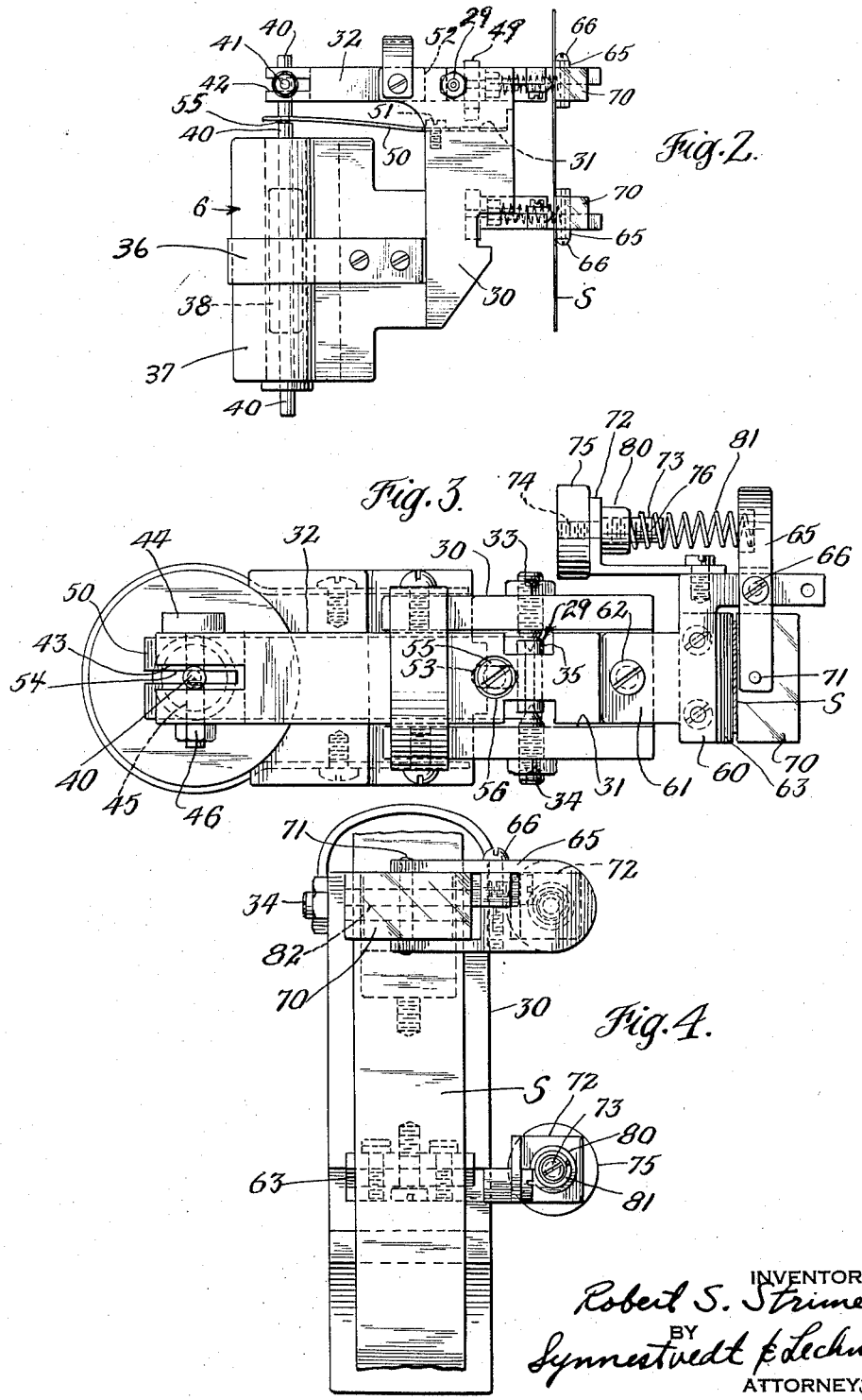

2,910,778
INSTRUMENTATION FOR STRAIN TESTING

Robert S. Strimel, Penllyn, Pa., assignor to Tinius Olsen Testing Machine Company, Willow Grove, Pa., a corporation of Pennsylvania Application March 1, 1957, Serial No. 643,287

7 Claims. (Cl. 33—148)

This invention relates to materials testing equipment and in particular relates to instrumentation for sensing strain in an article under test.

One of the objects of this invention is to provide instrumentation for obtaining true stress-strain curves, moduli and yield strength of very thin or small diametered material such as metallic foils, plastic film, textile yarns, fine wires and the like.

Another object of the invention is to provide instrumentation directly mountable on a specimen of material in foil or fine wire-like form to sense strain of the material when subjected to a tension test.

Another object of the invention is to provide a strain-sensing instrumentation directly mountable on a specimen of material in foil or fine wire-like form which is arranged in a manner so that virtually no parasitic loads are imposed on the material when tested in tension.

Another object of the invention is to provide instrumentation directly mountable on a specimen of material in foil or fine wire-like form which will very accurately follow the strain or elongation of the material when tested in tension.

Another object of the invention is to provide strain-sensing instrumentation directly mountable on a specimen of material in foil or fine wire-like form having knife-edge type clamps arranged so that the alignment of the specimen with respect to the knife edges can be viewed.

Another object of the invention is to provide strain-sensing instrumentation directly mountable on a specimen of material in foil or fine wire-like form having knife-edge type clamps including a transparent gripping block so that the material gripped between the edge and the block can be seen.

Another object of the invention is to provide strain-sensing instrumentation directly mountable on a specimen of material in foil or fine wire-like form having relatively movable strain-following knife edges with a spring operatively connected therebetween which is adjustable for setting the gage length of the edges or for use in counterbalancing the edges.

Another object of the invention is to provide strain-sensing instrumentation directly mountable on a specimen of material in foil or fine wire-like form having knife-edge type clamps arranged to uniformly grip a specimen of non-uniform thickness.

Another object of the invention is to provide strain-sensing instrumentation directly mountable on a specimen of material in foil or fine wire-like form having knife-edge type clamps each including a gripping block mounted on the knife edge to be movable toward and away from and tiltable with respect thereto.

Another object of the invention is to provide strain-sensing instrumentation directly mountable on a specimen of material having knife-edge type clamps, each including a gripping a gripping block mounted on the knife edge to be movable toward and away and tiltable with respect thereto together with an adjustable spring to urge the block towards the knife edge.

Another object of the invention is to provide instrumentation for obtaining true stress-strain curves of very thin or small diametered materials including relatively movable strain-following knife edges, each having an elongated flat gripping surface whose width is in the order of 0.005 inch.

Another object of the invention is to provide instrumentation particularly suitable for obtaining true stress-strain curves of very thin or small diametered material yet entirely suitable for use in obtaining stress-strain curves of relatively thick or large diametered material.

Numerous other objects will be apparent from the description to follow taken in conjunction with the drawings wherein:

Figure 1 is an overall view of strain-sensing instrumentation constructed in accordance with the invention directly mounted on a specimen of foil-like material;

Figure 2 is a side elevation view of part of the instrumentation of Figure 1;

Figure 3 is an enlarged plan view of Figure 2;

Figure 4 is an enlarged front view looking toward the left in Figure 2;

Figure 5 is an enlarged front view of the upper specimen clamp of the device of Figure 2;

Figure 6 is a front view of the specimen clamp of Figure 5 with certain parts removed;

Figure 7 is a cross section on the line 7—7 of Figure 5;

Figure 8 is a fragmentary view of the upper specimen clamp of Figure 2;

Figure 9 is another fragmentary view of the specimen clamp of Figure 2; and

Figure 10 is a fragmentary view of a knife edge made in accordance with the invention.

Before proceeding with a detailed descrpition of the invention it is desired to comment briefly on certain aspects of testing material in foil or wire-like form.

In the strain testing of metals, plastics and the like, it is common practice to mount a strain-sensing device, such as an extensometer, on a sample or specimen of the material to be tested, particularly where the specimen is of a mass or rigidity to easily support the extensometer without deformation and where the absolute stress or load involved is exceedingly high as compared with any parasitic loads which may be imposed on the specimens by the mounting of the extensometer. In such instances, it has been relatively easy to directly obtain stress-strain curves, moduli and the like. However, with the use of prior equipment, such techniques were impossible with metal or plastic made up in foil or fine wire-like form, for example, aluminum foil, shim steel or brass, plastic film, such as cellophane, or with frangible material, such as natural or synthetic textile yarns.

Prior to this invention, so-called stress-strain curves of materials in the form described were made or recorded by supporting a specimen between grips secured to the crossheads of a testing machine and then moving the crossheads at a known rate so that the load and distance between grips is recorded as a function of time. This method, of course, is based on the assumption that the distance the grips or crossheads move represents the elongation of the specimen. I have found from actual tests, however, that this assumption is erroneous. Data obtained via this route is inaccurate and highly inconsistent and varies as a function of gage length (initial distance between specimen grips), the testing speed and the type of grips used. For example, with several identical specimens and identical testing conditions, except for variations in gage length, different stress-strain curves, hence different moduli, yield strength, etc., result.

Prior to this invention, to my knowledge, there has not been instrumentation available which would be functionally independent of the above factors and enable the obtaining of true and accurate stress-strain curves with material of the kind in question. The present invention, however, does provide such instrumentation and in the development of the same I have discovered several factors or problems, the prior lack of solution of which may explain why instrumentation has not heretofore been available. A discussion of such factors follows.

The present invention contemplates the mounting of strain-sensing instrumentation directly on a specimen and arranged to precisely follow the actual elongation or strain. However, the placing of such a device on the specimen is difficult because a specimen of metal, plastic or fibrous material in foil or fine wire-like form is incapable by itself of supporting a strain-sensing device particularly where the device has a mass or weight much greater than the sample to be tested. Furthermore, in tension testing of such materials the amount of strain upon which is based the elastic properties is relatively small and must be accurately measured, and, therefore, any movement of the sensing device other than that caused by actual strain will result in considerable error. Additionally, the stress required to elongate such specimen is very small, for example, being in the order of a few pounds. Thus, it will be appreciated that any stress which is put on the specimen other than that of the known testing stress, will also produce large errors. Therefore, the device which senses the elongation of the specimen must be secured thereto in a manner so as to be sensitive only to the elongation of the specimen and must not impose any parasitic loads. In addition, further problems arise out of the fact that as the specimen elongates, its cross-sectional area decreases and the instrumentation sensing the elongation must take into account these motions. For example, the decrease in cross-sectional area can effect an inward movement of the sensing device and the elongation itself can effect a movement of the device in a vertical direction. While accommodating these motions, the instrument must be arranged so as not to impose parasitic loads.

Another problem in testing tension of the materials of the kind in question arises in connection with the grips which are used to interconnect the strain-sensing device or extensometer with the specimen. In the usual type of testing the extensometer grips are provided with knife edges which are important for several reasons, for example, in providing a means which will firmly grip the specimen and thereby accurately follow the elongation. Furthermore, very sharp knife edges are used so as to obtain highly accurate gage length. However, when thin films or wires are used, such knife edges are impractical, inasmuch as very sharp edges will cut the specimen and yet very dull, so to speak, edges will not provide a firm enough grip to accurately follow the strain nor provide gage length accurately. Another problem in connection with the grips is that the same must be of a nature so that the area of the specimen which is gripped can be seen. For example, when testing thin plastic film, such as cellophane, if the same is overlapped in the gripping surface, internal stresses may be set up which under the conditions of testing can erroneously effect the results. Furthermore, it is important that the specimen be aligned in the grips so that it extends in the same direction as the direction of applied stress.

Another problem in connection with the gripping of materials of the kind in question is in the fact that the films may not be of uniform thickness in the sense of the faces not being parallel and, therefore, the grips must be capable of accommodating this irregularity so that the gripping force is distributed substantially uniformly over the surface of the specimen.

The present invention provides solutions to all of the problems discussed above and a preferred form of the invention will be explained following.

In Figure 1 a specimen S is shown supported in a generally vertical position between upper grip 1 and lower grip 2 which are respectively interconnected to the crossheads of a testing machine not shown. In testing the specimen for tension, the crossheads of grips 1 and 2 are moved relatively apart in the direction indicated by the arrows $a$. In some types of testing machines the lower grip is held fixed while the upper grip is moved and in other types of testing machines the upper grip is held fixed while the lower grip is moved. In this manner the specimen is stressed, the effect of which is to strain or elongate the specimen generally in the vertical direction or as indicated by the arrows $a$. On the specimen is mounted a strain-sensing device or extensometer 3 having strain-sensing clamps 4 and 5. The clamp 5 has a pivotal connection so that when the specimen is elongated, the motion is sensed or followed by the two clamps moving relatively apart from one another. In the testing of materials in the forms as heretofore described, elongation of the specimen not only effects a relative motion as between the clamps 4 and 5, but also a motion of the extensometer as a whole in the vertical direction. For example, when the upper grip is fixed and the lower grip is moved, the extensometer, including the lower clamp 4, moves downwardly. The upper clamp 5 also moves downwardly but at the same time its pivotal connection provides for relative motion upwardly with respect to the clamp 4. In addition, as the specimen elongates, its cross-section area decreases and, therefore, there is a motion of the extensometer in a direction transverse the elongation to accommodate the reduction.

The above motion of the clamps is detected by a transducer preferably a differential transformer indicated by the numeral 6. The transformer develops a signal proportional to the elongation which is fed to a recorder of the type such as shown in my copending application 261,239, now Patent No. 2,812,229.

The extensometer is supported by a suspension system generally designated by the numeral 10 which accommodates said motion and imposes virtually no parasitic loads. This comprises a frame bar 11 which is connected to the extensometer at its lower end and at its upper end is hung by a universal swivel 12 to a tilt bar 13. At the opposite end of the tilt arm is a weight 14′ movable back and forth and settable in any adjusted position by way of the set screw 15. A precision pivot 16, which is preferably ball-bearing type, connects the tilt bar 13 with a vertically extending support bar 14. The pivotal connection 16 permits the arm 13 to tilt in the direction shown by the arrows $b$ and in a generally vertical plane which normally contains the axis of the direction of strain of the specimen. The vertical support bar 14 has a precision pivot 21, preferably a ball-bearing type, at its upper end which is interconnected to a collar 22 which is slidably mounted on the rod 23. The pivotal connection 21 provides for the arm 14 to be swingable in the direction indicated by the arrows $c$ in the plane of operation of the tilt bar 13. The arrangement of the tilt bar 13 and support bar 14 on the pivotal connections 16 and 21 provides for the tilt bar to have freedom for motion in a direction transverse the direction of elongation.

The collar 22 may be moved back and forth on the arm 23 and locked in a desired position by the set screw 24. The arm 23 is supported on a column 25 which preferably forms part of testing machine, not shown. A clamp 26 permits the arm 23 to be adjusted in a vertical direction.

In setting up the components of Figure 1 for testing, the clamp 26 is adjusted on the column 25 so that the clamps 4 and 5 are disposed intermediate the grips 1 and 2 in position for connection with a specimen. The collar 24 is adjusted on the bar 23 until the clamps 4 and 5 are approximately in line with the axis of the specimen elongation. Then the weight 14′ is precisely adjusted on the tilt bar until the same occupies a substantial horizontal position. A specimen is then placed in the grips 1 and 2 and then the clamps 4 and 5 are secured thereto. Inasmuch as the suspension system and extensometer are counterbalanced, the loading effect on the specimen is negligible. Indeed I have found that a specimen can be elongated to an extent causing as much as a 30° tilt of the bar 13 without undesirable parasitic loads being imposed.

Turning now to the details of construction of the extensometer, the instrument includes a main body or frame 30 formed at its upper end with a channel 31 in which is disposed a lever arm 32. The lever arm has a pivotal connection 29 with the sides of the channel comprising the cone-shaped studs 33 and 34 mounted on the frame engaging the hardened bushing 35 mounted in the lever. On the lower part of the frame 30 is a bracket 36 which supports a housing 37 of the differential transformer 6. The transformer has the usual coils, not shown, together with a core element indicated at 38. The core is attached to a core stem 40 which extends upwardly and is interconnected to the lever 32 by a pivotal connection 41.

The pivotal connection 41 is an important feature of the invention and will be explained in detail following. From an inspection of Figures 2 and 3 it will be seen that the end of the lever 32 has a horizontal slot 42 and a vertical slot 43, the core stem 40 projecting upwardly through the slot 43. A head 44 has a pin 45 which extends into the slot 42 and carries at its outer end a locking nut 46. The core stem 40 has an aperture through which the pin 45 extends. By loosening the nut 46, the pin and stem can be shifted back and forth in the slots. This motion will cause a change in the distance between the pivotal connections 29 and 41 so that the lineal motion of the core 38 can be made to vary for the same angular motion of the lever. Thus, the signal developed by the transducer can vary, depending on the distance between the pivotal connection, for the same angular motion of the lever. I have found that the pivot arrangement described is highly useful in the calibration of the instrument as the same acts in the nature of a vernier adjustment.

Mounted on the lever arm 32 is a set screw 49 which, when the lever is rotated clockwise (as viewed in Figure 2), abuts the bottom of the channel. The screw is adjusted so that at contact, the knife-edged clamps 4 and 5 are set at the correct gage length. On the bottom of the channel 31 is mounted a leaf spring 50 which is held in the channel by a set screw 51. The set screw may be adjusted by inserting a tool through the aperture 52 in the lever arm. The spring has an elongated slot 53 which accommodates the set screw and when the screw is loosened, the spring can be moved form left to right as viewed in Figure 2. The outer end of the spring has a slit 54 which is disposed in a groove 55 provided on the core stem 40. As will be apparent, moving the spring left or right will vary the force the spring can exert on the core stem. The adjustability of the spring 50 as above described is an important feature since the same can be adjusted so that it exerts a force to rotate the lever arm 32 until the screw 49 contacts the bottom of the channel so that the clamps 4 and 5 are automatically set at the desired gage length. With this arrangement the spring is adjusted so that its force is just enough to cause the screw 49 to make contact. Therefore, there is an absolute minimum of force on the lever which has to be overcome during testing. In testing of certain types of materials, particularly where automatic setting of gage length is not important and where stressing loads are very low, the spring may be taken off the instrument or can be used in counterbalancing the lever.

The clamps 4 and 5 are identical in form and the description of the details of construction thereof will be only in connection with the top grip 5. Suffice it to say that the lower grip 4 is held fixed on the frame 30. As best seen in Figure 3, the grip includes a generally L-shaped body 60 having an extension 61 which is secured to the lever 32 by the screw 62. As best seen in Figure 7, a knife edge 63 is secured to the lower portion of the body 60 by the screws 64. The body 60 carries a U-shaped plate 65 which is pivotally connected thereto as by the screw 66. The plate 65 carries a block 70 which is movable with respect to the plate as by the pivot 71. On the body 60 is a bracket 72 which carries a dual threaded stud 73, the threads 74 thereof mounting the lock nut 75 and the threads 76 mounting the adjusting nut 80. Between the nut 80 and the plate 65 is a spring 81. The spring tends to rotate the plate in the clockwise direction as viewed in Figure 3 so as to bring the block toward the knife edge 62 and so effect a clamping of a specimen. The force exerted by the spring can be adjusted by positioning the nut 80 on the stud 73.

One of the important features of the clamp is in the fact that the area of the specimen which is gripped can be seen. In the preferred embodiment this is brought about by making the block 70 of transparent material. The effect, of course, is to permit viewing of the area gripped by the knife edge. This is illustrated particularly in Figures 2 and 5 wherein the outline of the knife edge is indicated by the dotted lines 82.

Another important feature of the clamps is that the same are arranged to accommodate specimens of non-uniform thickness. This is illustrated in Figure 9 where it will be seen that the specimen S' is somewhat wedged in shape. However, the pivoting action of the plate 65 and block 70 accommodate the irregularity and so the knife edge and block firmly grip the specimen.

Another important feature of the clamps is in the fact that the block 70 can be adjusted with respect to the knife edge to accommodate materials of varying thickness. This is illustrated in Figure 8 where it will be noted that the pivot 71 is to one side of the center of the block. In this manner either the surface A can be presented to the knife edge. If, however, the plate 65 is placed on the body 60 so that the screw 66 goes through the aperture 84, not only can the surface A be presented to the knife edge, but the block may be reversed 180° so that the surface B is presented to the knife edge.

In certain instances the surfaces A and B of the block 70 may be shaped to be somewhat contoured (in a vertical direction). This prevents the upper and lower edges of the block from contacting the specimen in a manner to impose parasitic forces and strain detections.

Another feature of importance is the preferred configuration of the knife edge as illustrated in Figure 10. In this form the width e of the edge is approximately 0.005 inch, and each corner is broken with a radius R of approximately 0.005 inch. With this arrangement I have found that the edges are sufficiently sharp to obtain accurate gage length yet blunt enough to give a good gripping effect without cutting a specimen.

Before closing it should be pointed out that the lever arm 32 and the various components connected thereto, such as the core and core stem, the pivotal connection 41, the clamps 4, etc., are arranged for counterbalance. In other words, the mass on one side of the lever pivot 29 is the same as the mass on the opposite side.

I claim:

1. Instrumentation for strain testing comprising: a frame; a channel formed on the top of said frame; a lever arm disposed in said channel and extending outwardly from both ends thereof, one end of the lever having a knife edge and the other end being formed with a vertical and a horizontal slot transecting each other; a pivot connection between the lever arm and the frame providing for tilting of the lever arm in said channel; a second knife edge fixed to said frame; a transducer including coils fixed to said frame and a core having an elongated rod, one end of which extends through said vertical slot; a pin extending through said horizontal slot and through said rod whereby to form a pivotal connection for the rod, the rod and the pin being movable together in their respective slots whereby to provide for changing the distance between first and last said pivot connections; a pair of specimen clamps respectively associated with said knife edges, each clamp including a transparent block having a flat face for holding a specimen on the knife edge, a plate having a pivotal connection with said block and with said knife edge whereby the block is movable toward and away from and tiltable with respect to the knife edge; and adjustable spring means operatively connected to said plate to move the same whereby to urge the block toward said knife edge.

2. Instrumentation for strain testing comprising: a frame; a channel formed on the top of said frame; a lever arm disposed in said channel and extending outwardly from both ends thereof, one end of the lever having a knife edge and the other end being formed with a vertical and a horizontal slot transecting each other; a pivotal connection between the lever arm and the frame providing for tilting of the lever arm in said channel; a second knife edge fixed to said frame; a transducer including coils fixed to said frame and a core having an elongated rod, one end of which extends through said vertical slot; a pin extending through said horizontal slot and through said rod whereby to form a pivotal connection for the rod, the rod and the pin being movable together in their respective slots whereby to provide for changing the distance between first and last said pivot connections; a spring interconnected between said lever arm and said frame and operating to urge the arm in a predetermined direction, the spring being adjustable whereby to vary the force exerted thereby; a pair of specimen clamps respectively associated with said knife edges, each clamp including a transparent block having a flat face for holding a specimen on the knife edge, a plate having a pivotal connection with said block and with said knife edge whereby the block is movable toward and away from and tiltable with respect to the knife edge; and adjustable spring means operatively connected to said plate to move the same whereby to urge the block toward said knife edge.

3. Instrumentation for strain testing comprising: a frame; a lever arm disposed on said frame and having a knife edge at one end thereof; a pivotal connection between the lever arm and the frame providing for tilting of the lever; a second knife edge fixed to said frame; a transducer including coils fixed to said frame and a core having an elongated rod, one end of which extends adjacent said lever arm; a pivotal connection between said rod and said lever arm; and a pair of specimen clamps respectively associated with said knife edges, each clamp including a transparent block and a spring to urge the block toward the knife edge, the knife edge and transparent block cooperating to grip a specimen and said transparency permitting the gripped area of the specimen to be viewed through the block.

4. Instrumentation for strain testing comprising: a frame; a lever arm disposed on said frame and having a knife edge at one end thereof; a pivotal connection between the lever arm and the frame providing for tilting of the lever; a second knife edge fixed to said frame; a transducer including coils fixed to said frame and a core having an elongated rod, one end of which extends adjacent said lever arm; a pivotal connection between said rod and said lever arm; and a pair of specimen clamps respectively associated with said knife edges, each clamp including a transparent block, interconnections between the block and the knife edge providing for the block to be movable toward and away from and tiltable with respect to the knife edge and spring means normally urging the block toward the knife edge, said knife edge and said transparent block cooperating to grip a specimen and said transparency permitting the gripped area of the specimen to be viewed through the block.

5. Instrumentation for the strain testing of a flat, elongated specimen comprising: a frame; a lever arm disposed on said frame and having a knife edge at one end thereof; a pivotal connection between the lever arm and the frame providing for tilting of the lever arm; a second knife edge fixed to said frame; an abutment limiting the tilting of the lever arm in one direction for the purpose of predeterminably setting gauge length; a transducer including coils fixed to said frame and a core having an elongated rod one end of which extends adjacent said lever arm; a pivotal connection between said rod and said lever arm; a spring interconnected between said rod and said frame and urging the frame in a direction to cause engagement of said abutment, the spring being adjustable for the purpose of setting the force exerted thereby; and a pair of specimen clamps respectively associated with said knife edges, each clamp including a block having a flat surface for engaging the specimen and clamping the same to a knife edge, interconnections between the block and the knife edge providing for movement of the block toward and away from the knife edge to accommodate specimens of different thicknesses and tiltable with respect to the knife edge about an axis parallel to the axis of the specimen to accommodate irregularities of specimen thickness and spring means to urge the block toward the knife edge.

6. Instrumentation for the strain testing of a flat, elongated specimen comprising: a frame; a lever arm disposed on said frame and having a knife edge at one end thereof; a pivotal connection between the lever arm and the frame providing for tilting of the lever; a second knife edge fixed to said frame; a transducer including coils fixed to said frame and a core having an elongated rod, one end of which extends adjacent said lever arm; a pivotal connection between said rod and said lever arm; and a pair of specimen clamps respectively associated with said knife edges, each clamp including a block, interconnections between the block having a flat surface for engaging the specimen and clamping the same to the knife edge and the knife edge providing for the block to be movable toward and away from said knife edge to a given adjusted position to accommodate specimens of different thicknesses and tiltable with respect to the knife edge in any adjusted position about an axis parallel to the axis to the specimen to accommodate irregularities of specimen thickness and spring means to urge the block toward the knife edge.

7. A construction in accordance with claim 6 wherein last said spring means is mounted in adjusting mechanism for varying the spring force.

References Cited in the file of this patent

UNITED STATES PATENTS

| | | |
|---|---|---|
| 568,015 | Best | Sept. 22, 1896 |
| 1,375,385 | Guillery | Apr. 19, 1921 |
| 2,138,411 | Tornebohm | Nov. 29, 1938 |
| 2,588,630 | Jackman | Mar. 11, 1952 |
| 2,768,447 | Strimel | Oct. 30, 1956 |

FOREIGN PATENTS

| | | |
|---|---|---|
| 289,203 | Great Britain | Apr. 26, 1928 |

UNITED STATES PATENT OFFICE
CERTIFICATE OF CORRECTION

Patent No. 2,910,778                                        November 3, 1959

Robert S. Strimel

It is hereby certified that error appears in the printed specification of the above numbered patent requiring correction and that the said Letters Patent should read as corrected below.

Column 1, line 69, strike out "a gripping", second occurrence; column 4, line 38, after "extensometer" insert -- 3 --; column 8, line 23, for "frame", second occurrence, read -- lever arm --; lines 48 to 50, strike out "having a flat surface for engaging the specimen and clamping the same to the knife edge" and insert the same after "block" and before the comma in line 47, same column 8.

Signed and sealed this 13th day of September 1960.

(SEAL)
Attest:

KARL H. AXLINE
Attesting Officer

ROBERT C. WATSON
Commissioner of Patents